Dec. 9, 1958 W. F. ENGEL 2,863,825
CATALYTIC REFORMING OF HYDROCARBON OILS
Filed Aug. 29, 1955
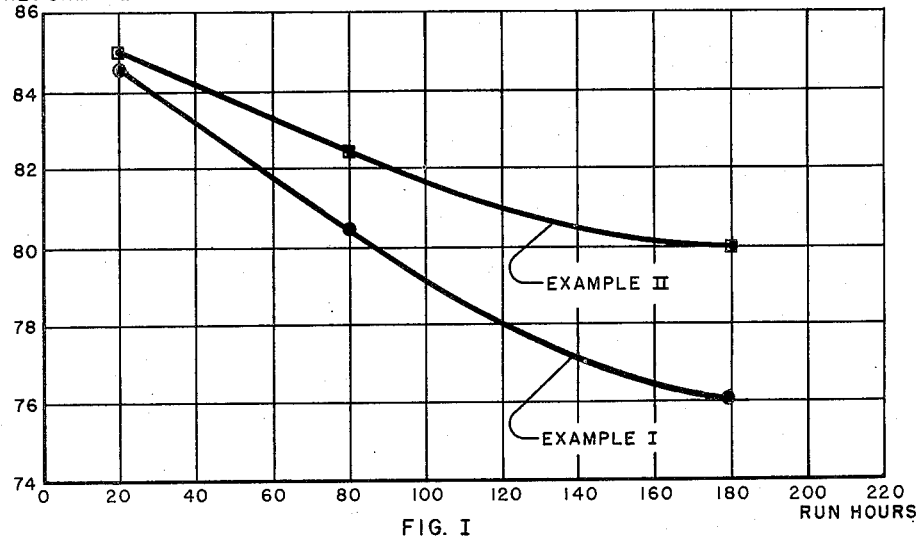
FIG. I
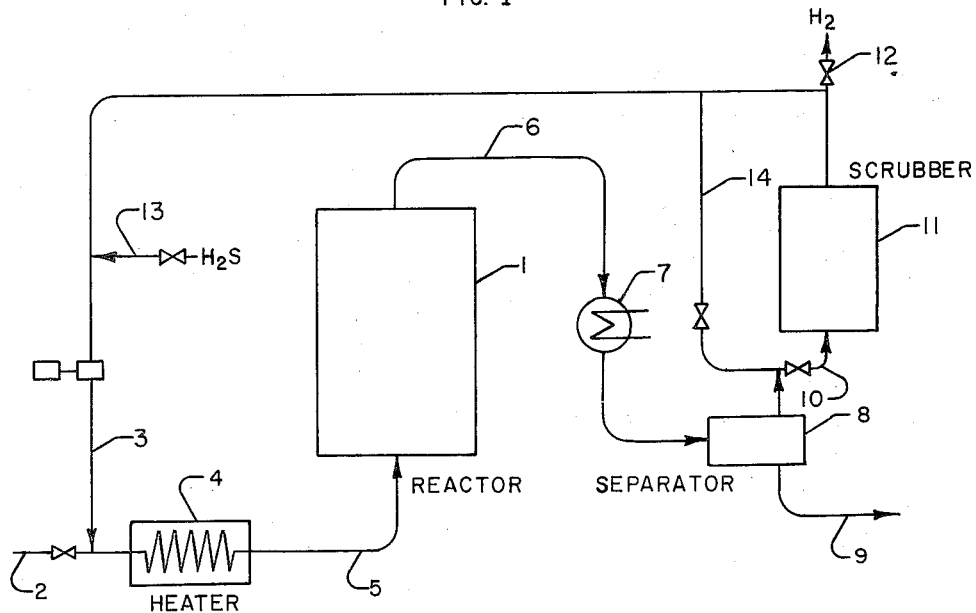
FIG. II
INVENTOR
WILLEM FREDERIK ENGEL
BY James Todorovic
HIS ATTORNEY 2,863,825
Patented Dec. 9, 1958

United States Patent Office 2,863,825

CATALYTIC REFORMING OF HYDROCARBON OILS

Willem Frederik Engel, Amsterdam, Netherlands, assignor to Shell Development Company, New York, N. Y., a corporation of Delaware Application August 29, 1955, Serial No. 530,988

Claims priority, application Netherlands September 24, 1954

6 Claims. (Cl. 208—138)

This invention relates to the reforming of hydrocarbon oils boiling essentially in the gasoline range under severe conditions to increase the motor method octane number to a point in the range above 80 using a platinum catalyst in the presence of hydrogen under pressure.

The object of the invention is to provide a means whereby the platinum catalyst may be used under severe conditions with a lower rate of decline in activity, or conversely to allow the platinum catalyst to be used under more severe conditions to obtain a better octane number improvement at the same rate of decline in catalyst activity.

In general outline, this object is accomplished by applying a special conditioning treatment to the catalyst before the hydrocarbon material to be reformed is passed over the catalyst. The conditioning is effected by treating the catalyst at an elevated temperature and preferably under pressure with hydrogen containing a small and controlled amount of hydrogen sulfide.

Hydrocarbon oils of the nature of gasoline may generally be improved by catalytic reforming and most of the many suggested reforming catalysts are capable of increasing the octane number of the gasoline to values in the range above 80 F–2–O (clear motor method octane number) if the reforming conditions are made sufficiently severe. In the catalytic reforming process used during the late war and up until recently so-called sulfactive catalysts were applied. These catalysts were dependent primarily upon the dehydrogenation activity of group VI metal sulfides or oxides. These catalysts could be used over extended process periods provided that the severity of the conditions was strictly curtailed. The octane numbers obtainable by such processing were, however, insufficient to meet the requirements and it was therefore necessary in practice to operate under much more severe conditions to produce a product having an F–2–O octane number of about 80. Under these conditions the catalyst rapidly declined in activity so that in practice it was regenerated about every 6 hours.

More recently it was found that the catalytic reforming of such materials can be more efficiently effected using a catalyst containing platinum as the dehydrogenation promoter. This process, one variation of which is widely used under the name of platforming, not only provides a better yield-octane number relationship compared to the previously used catalytic reforming process but also allows the operation to be effected with longer process periods. With some straight-run gasoline feed stocks it is possible to operate essentially continuously to obtain a product with an F–2–O octane number somewhat above 80. When the conditions are made more severe to meet the ever increasing octane number requirements this catalyst also shows a definite decline in activity which although slower than in the older process is nevertheless of importance in view of the high cost of the catalyst and the difficulty encountered in regenerating it.

This is particularly the case when treating feed stocks such as straight run gasoline fractions derived from East Texas, Pennsylvania, Michigan and Kuwait petroleum which are low in naphthene content, e. g. contain less than 50% naphthenes. In order to obtain a satisfactory octane number with such stocks it is necessary to operate at pressures below approximately 30 atmospheres and otherwise severe conditions and this leads to a fairly rapid decline in the activity of the catalyst even when using a large excess of recycled hydrogen.

In the older hydroforming process moderate amounts of sulfur in the feed stocks were not detrimental due to the sulfactive nature of the catalyst used. In fact, a small amount of sulfur was beneficial and was therefore sometimes added in cases where the feed stock was essentially free of sulfur. In the case of the platinum catalyst, on the other hand, it is well known that sulfur is a severe poison. Consequently, if the stock to be treated contains any appreciable amount of sulfur and it is desired to reform it to an octane number above about 80 F–2–O it is the practice to first subject it to a desulfurization treatment to reduce the sulfur content to a few thousandths of a percent.

The platinum catalyst is normally prepared free of sulfur. For example, an alumina base is impregnated with HF to incorporate approximately 0.1 to 1% HF and then impregnated with a soluble platinum compound, e. g., chloro-platinic acid, to incorporate 0.01 to 1% platinum. After drying, calcining, and reducing in the conventional way, the catalyst is normally ready for use. A good catalyst which may or may not contain halogen, may be prepared by impregnating an acidic silica-alumina composite with 0.01 to 1% platinum. The various suitable carrier materials, applicable soluble platinum compounds, and methods of preparing the catalyst are well-known and since these are not part of the invention they will not be described in detail. It is worthy of note, however, that the catalyst is sometimes prepared with sulfur by precipitating the platinum with hydrogen sulfide. In these cases where the platinum is incorporated in the catalyst in the sulfide form the sulfur does no harm since it is removed from the catalyst when the catalyst is subjected to the conventional reduction with hydrogen prior to use. Even the pre-heating of the catalyst up to the reaction temperature by hydrogen preparatory to initiating a process period is sufficient to reduce the platinum and remove any sulfur added in this manner.

It has now been found that although platinum is well known to be poisoned by sulfur and sulfur in more than trace amounts in the feed is known to be harmful when reforming with platinum catalyst, especially when reforming to a high octane number, it is advantageous when reforming under severe conditions to treat the platinum catalyst just before use with limited amounts of hydrogen sulfide. Thus, when reforming with a platinum catalyst under severe conditions, such in particular as required with straight-run gasoline stocks which are low in naphthene content, the rate of decline of catalyst activity is materially reduced if the catalyst is pre-treated prior to use with hydrogen containing a small controlled amount of hydrogen sulfide. The hydrogen sulfide may be added as such or in the form of a sulfur compound which yields hydrogen sulfide under the prevailing conditions, e. g., alkyl mercaptans, dialkyl sulfides and the like. This pre-treatment of the catalyst may be effected in a separate operation or it may be effected while bringing the catalyst up to reaction temperature prior to starting a reforming run. It is usually applied after the conventional reduction of the catalyst with hydrogen but may be applied simultaneously with this reduction. As soon as the treatment of the feed stock is begun, the introduction of hydrogen sulfide is discontinued. However, since the poisoning effect of sulfur on the platinum catalyst is of the temporary kind and gradually disappears if a sulfur-free feed stock is substituted for one containing sulfur, the addition of the hydrogen sulfide may be continued for a short period during the initial part of the process period. On the other hand, adding hydrogen sulfide to the hydrocarbon feed during the initial part of the process without the said pre-treatment does not give the desired effect. The pre-treatment is preferably applied to the fresh charge of catalyst and also to the catalyst following regeneration. It may be applied to the catalyst in a separate vessel but is preferably applied in the reactor in which the catalyst is to be subsequently used.

The temperature at which the conditioning of the catalyst is carried out is generally between 300 and 550° C. and preferably between 400 and 500° C. It may be carried out at atmospheric pressure, superatmospheric pressure, or sub-atmospheric pressure. It is preferably carried out in such a way that the previous reduction of the catalyst is effected at atmospheric pressure and the subsequent conditioning treatment is then wholly or mainly effected at elevated pressure, e. g., the the same pressure as will be later used in the reforming operation.

In order to obtain the desired results it is necessary for the hydrogen sulfide concentration in the hydrogen used for the conditioning treatment to be low and generally less than 5% by volume since with higher concentrations the desired effect is not obtained. The optimum effect is usually obtained with hydrogen sulfide concentrations less than 1% by volume, e. g., 0.005 to 0.1% by volume.

The time required for conditioning the catalyst depends somewhat on the hydrogen sulfide concentration in the hydrogen passed over the catalyst and the flow rate. In most instances a relatively short time is sufficient but if desired the treatment may be continued for a long period, e. g., 10 hours or more. During the treatment the temperature may be kept constant or practically so within the limits indicated above but it is also possible to begin the pre-treatment at a relatively low temperature, e. g., 300 to 400° C. and gradually increase the temperature during the treatment to, for example, 480 to 500° C. When using hydrogen containing 0.04% by volume of hydrogen sulfide and a flow rate of 1200 liters per liter of catalyst per hour excellent results are obtained with a pre-treatment lasting approximately 3 hours during which time the temperature is gradually raised from 400 to 480° C.

The pre-treatment according to the invention is beneficial when applied in the reforming of gasoline fractions containing sulfur as well as gasoline fractions completely free of sulfur such, for example as Fischer-Tropsch gasoline and fractions thereof. If desired, the lowest boiling and the highest boiling gasolines may be removed from the gasoline feed by fractional distillation prior to the reforming treatment.

The process of the invention and the technical effect obtained thereby will be further illustrated by means of the following examples:

*Example I*

A platinum-alumina-halogen catalyst containing 0.37% by weight platinum, 0.2% by weight chlorine, 0.5% by weight fluorine and the remainder alumina, which catalyst had a surface area of approximately 165 m.$^2$/g., was heated to 465° C. in two hours at atmospheric pressure while passing over the catalyst 1200 liters of sulfur-free-hydrogen per liter of catalyst per hour. With the same flow rate the pressure was then increased to 15 atmospheres while the temperature was maintained at 465° C. for a further 2 hours. A straight-run naphtha together with 2000 liters of hydrogen per kilogram of naphtha was then passed over the thus treated catalyst at a through-put rate of 0.6 kilogram per liter of catalyst per hour while maintaining the pressure at 15 atmospheres. The straight-run naphtha boiled between 120 and 200° C., had an F-2-O octane number of 30, and contained 17% by weight aromatics, 25% by weight naphthenes, 58% by weight paraffins and 0.07% by weight sulfur.

The temperature was increased to 480° C. during a period of 13 hours while the supply of hydrogen and naphtha were gradually increased to 1.2 kilograms of naphtha per liter of catalyst per hour and 1200 liters of hydrogen per kilogram of naphtha. The reforming was then continued under these conditions for 180 hours. During the initial part of the process period (20 hours) an 80% by weight yield of liquid product having an F-2-O octane number of 84.5 was obtained. At the end of a hundred hours the octane number had decreased to 80.5 and at the end of 180 hours it had decreased to 76.

*Example II*

The same catalyst as used in Example I was used to reform the same naphtha under the same conditions. In this case, however, 0.04% by volume of hydrogen sulfide was added to the hydrogen when the temperature reached 400° C. during the pre-treatment of the catalyst. This addition of hydrogen sulfide was continued up to the point where the naphtha was contacted with the catalyst. In this case the initial activity (20 hours) was substantially the same as before, giving an 81% by weight yield of a product having an F-2-O octane number of 85. However, after 100 hours of processing the octane number had dropped to 82.5 and after 180 hours of operation it had dropped to only 80.

The activity decline rates obtained from pre-treating the catalyst with hydrogen in the conventional way and with dilute hydrogen sulfide according to the above examples are shown in the graph in Figure I of the accompanying drawing which graph is believed to be self-explanatory.

Figure II of the drawing is a diagrammatic flow scheme illustrating one preferred method of carrying out the invention when reforming a gasoline fraction containing a fair amount of sulfur, e. g., 0.08%. 1 represents the reforming reactor containing the freshly charged or freshly regenerated platinum catalyst. It will be understood that in place of a single reactor a series of reactors with interstage heating may be used. During the reforming operation the naphtha feed is introduced by line 2. Recycle hydrogen is introduced by line 3 and the mixture is pre-heated in heater 4 to the reaction temperature, e. g., 480° C. The hot mixture is then passed by line 5 to the reactor where it is contacted with the catalyst under a pressure of, for example, 15 atmospheres. The reformed vapors are passed by line 6 to a condenser 7 and then to separator 8. The reformed liquid product is removed by line 9. The product gas consisting essentially of hydrogen containing a small amount of hydrogen sulfide is passed by line 10 to the conventional scrubber 11 which reduces the hydrogen sulfide content from, for example 60 p. p. m. to 3 p. p. m. Part of this hydrogen is then removed by line 12 and the remainder is recycled by line 3.

According to the invention, before initiating this reforming operation the freshly charged catalyst in reactor 1 is gradually raised to the reaction temperature by recycling hydrogen through the heater and reactor. When the temperature reaches about 400° C. a small amount of hydrogen sulfide sufficient to give about 0.05% of H$_2$S in the recycle hydrogen stream is introduced by line 13 and this concentration of hydrogen sulfide is maintained until the reactor temperature has reached the temperature at which it is desired to start introducing the naphtha feed. During this period the recycle hydrogen is passed by line 14 to by-pass the scrubber 11. As soon as the naphtha feed is introduced or shortly thereafter the hydrogen is passed through the scrubber.

Example III

The portions of catalyst used in the reforming tests described in Examples I and II were regenerated by means of nitrogen containing a small amount of oxygen. In order to prevent the catalysts from undesirable high temperature a relatively low temperature of 350° C. and a low oxygen concentration of 1% were initially used. Finally, after the temperature and the oxygen concentration had been increased the catalyst was heated in an air stream to 500° C. for two hours.

The regenerated catalyst from Example I was then reduced with pure hydrogen and used in a further reforming test under the same conditions as in Example I. The regenerated catalyst from Example II was pre-treated in the same manner using hydrogen containing 0.04% by volume hydrogen sulfide and used for reforming again under the same conditions. The initial activity at 20 hours with the regenerated catalyst from Example I reduced in hydrogen was such as to produce an 81% by weight yield of a product having an F–2–O octane number of 83. During 100 hours' processing the F–2–O octane number dropped to 76.5.

The regenerated catalyst from Example II which had been pre-treated in accordance with the invention gave at 20 hours of processing an 81% by weight yield of a product having an F–2–O octane number of 84. During 100 hours of processing the F–2–O octane number dropped to only 80.5 as compared to 76.5 for the catalyst not so pre-treated.

Similar experiments were carried out using different concentrations of hydrogen sulfide in the hydrogen during the pre-conditioning step. These showed that the optimum effect is obtained at concentrations in the range of about 0.01 to 0.1% $H_2S$. Somewhat lower concentrations are effective as the pre-treatment is carried out at the lower temperatures for several hours. At concentrations above 1% the effect falls off and substantially disappears at about 5%. Calculations show that the optimum concentrations are somewhat less than those theoretically required to convert the platinum into the monosulfide whereas higher concentrations produce the more usual platinum disulfide. The observed effect of the conditioning pre-treatment is considered surprising since it is known that hydrogen sulfide and other sulfur compounds in the feed stock during processing inhibit the endothermic dehydrogenation activity of the platinum catalyst and enhance its acidic function and thereby the exothermic hydro-cracking reactions. These effects would be expected to promote cracking and higher temperatures both of which would be expected to shorten the life of the catalyst.

I claim as my invention:

1. A process for the catalytic reforming of naphtha by contact with a catalyst consisting of platinum supported on an aluminous carrier material, which comprises heating an active portion of said catalyst in a reactor while passing hydrogen therethrough, treating said catalyst, when it has been brought to an elevated temperature, with hydrogen containing a compound selected from the group consisting of hydrogen sulfide and sulfur compounds which yield hydrogen sulfide under the prevailing conditions, at a concentration of between 0.005 and 5% by volume of hydrogen sulfide, and then passing said naphtha into contact with said catalyst after the catalyst is at the desired reaction temperature while recycling substantially sulfur-free hydrogen to said catalyst.

2. A process for the catalytic reforming of sulfur-containing naphtha by contact with a catalyst consisting of platinum supported on an aluminous carrier material, which comprises heating an active portion of said catalyst in a reactor while passing hydrogen therethrough, treating said catalyst, when it has been brought to an elevated temperature, with hydrogen containing between 0.005 and 5% by volume of hydrogen sulfide, recycling said sulfur-containing hydrogen through said catalyst, passing said naphtha into contact with said catalyst after the catalyst is at the desired reaction temperature, and thereafter scrubbing hydrogen sulfide from the hydrogen portion of the product gas and recycling substantially sulfur-free hydrogen to said catalyst together with said naphtha.

3. Process according to claim 1 characterized in that the pre-conditioning treatment is effected at a temperature between 300 and 550° C.

4. Process according to claim 1 characterized in that the hydrogen sulfide concentration in the hydrogen lies between 0.005 and 0.1% by volume.

5. Process according to claim 1 characterized in that the conditioning is carried out at an elevated pressure which is conveniently the same as that at which the subsequent reforming operation takes place.

6. Process according to claim 1 characterized in that the reforming is carried out at a pressure less than 30 atmospheres with a gasoline fraction containing less than 50% naphthenes and under such conditions of severity as to produce a reformate having an F–2–O octane number of at least 80.

References Cited in the file of this patent

UNITED STATES PATENTS

| | | |
|---|---|---|
| 2,604,438 | Bannerot | July 22, 1952 |
| 2,654,694 | Berger et al. | Oct. 6, 1953 |
| 2,667,461 | Guyer et al. | Jan. 26, 1954 |
| 2,730,556 | Liedholm | Jan. 10, 1956 |
| 2,762,752 | Hemminger | Sept. 11, 1956 |
| 2,765,264 | Pasik | Oct. 2, 1956 |